March 24, 1931. L. E. WELLER 1,797,848
SAWING APPARATUS
Filed March 22, 1928 3 Sheets-Sheet 3
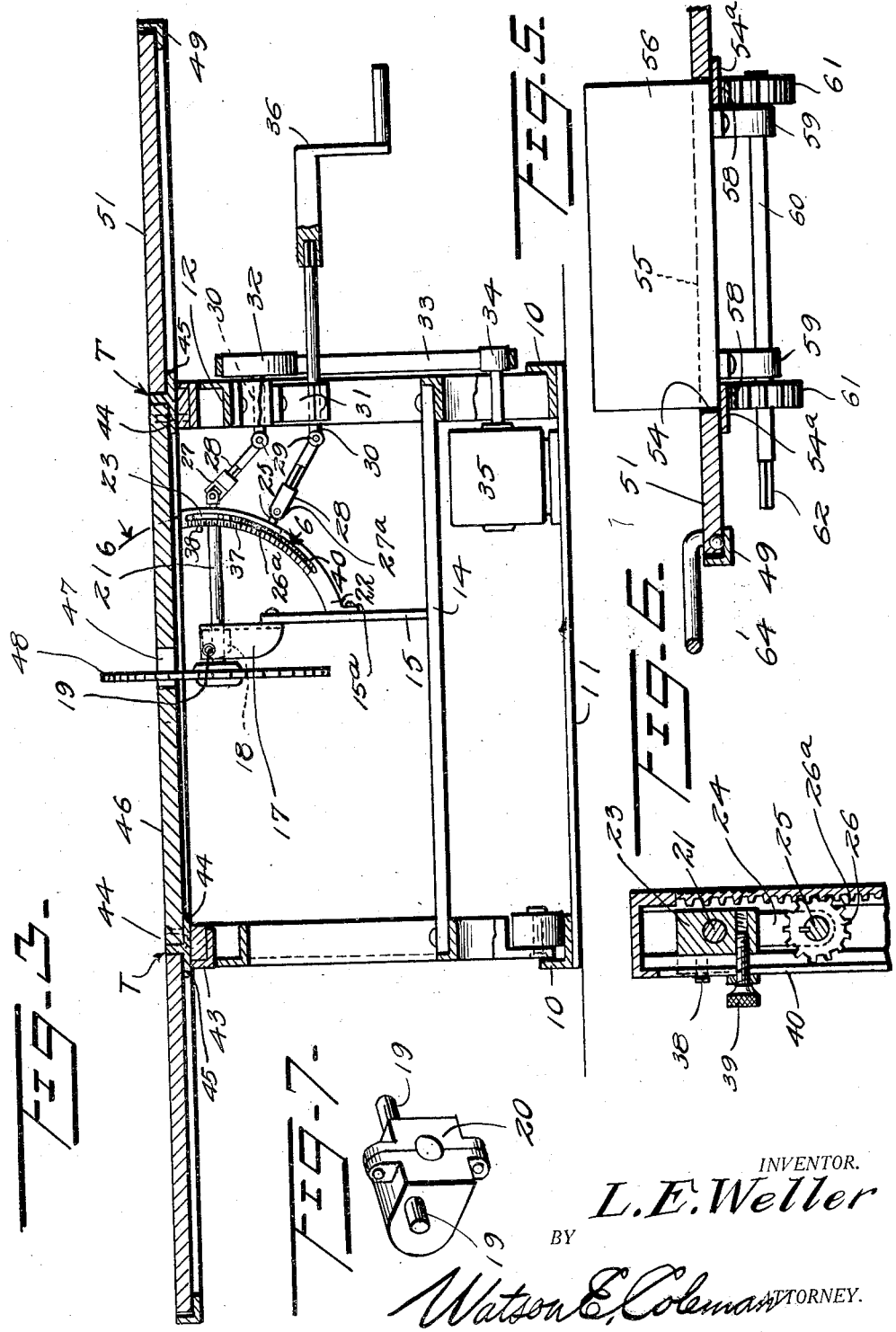
INVENTOR.
L.E.Weller
BY
Watson E. Coleman ATTORNEY.

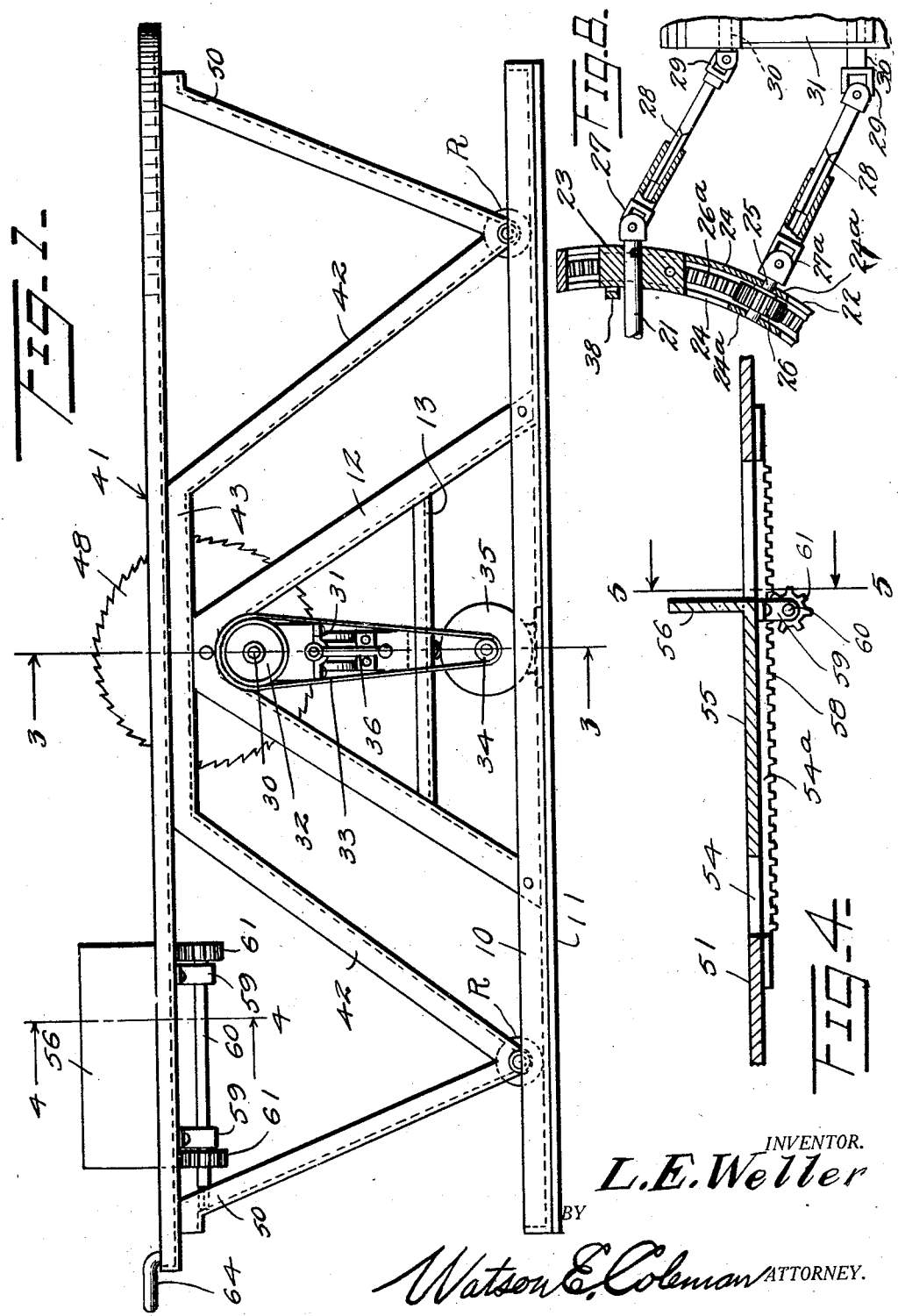

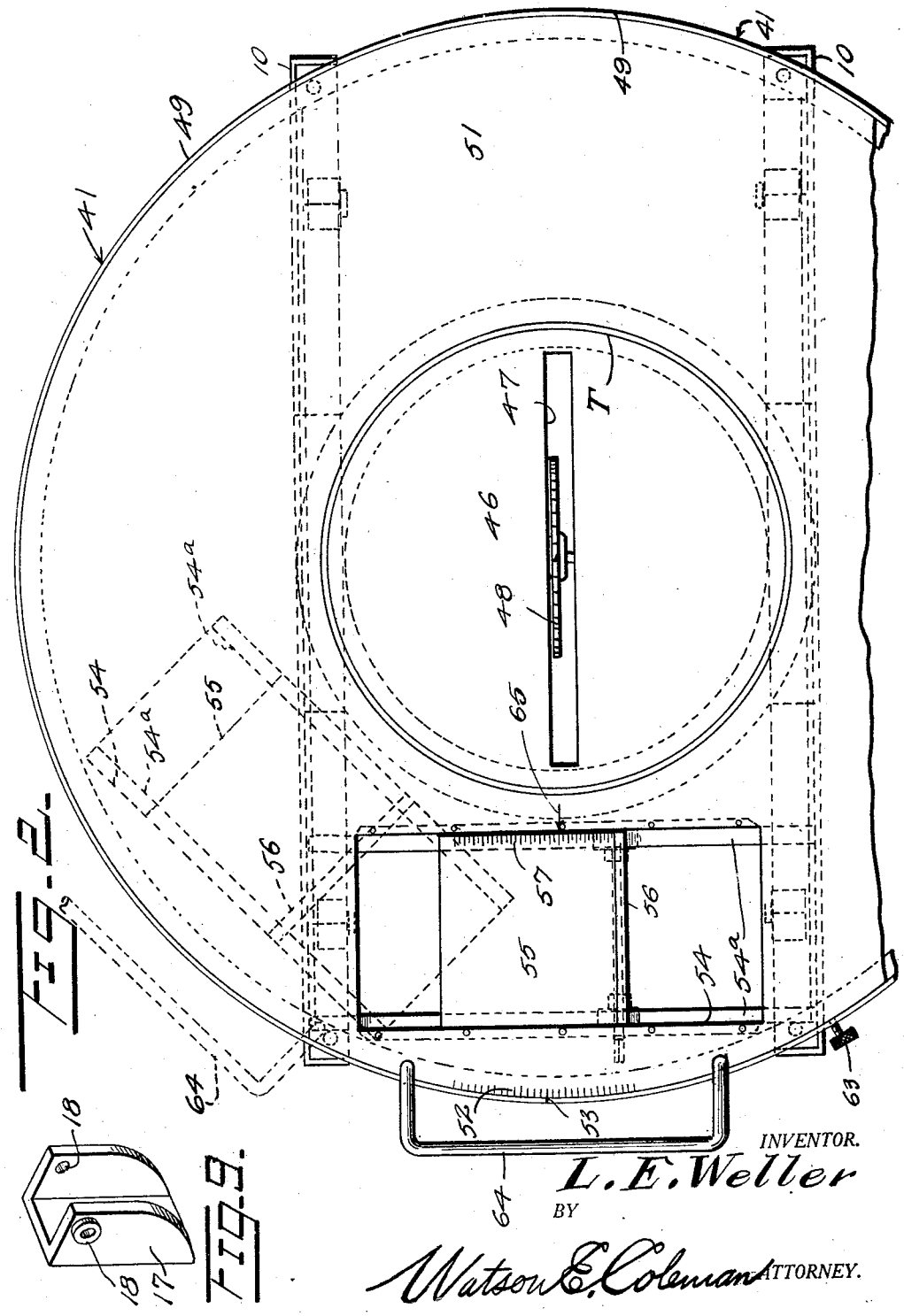

Patented Mar. 24, 1931

1,797,848

UNITED STATES PATENT OFFICE

LYNN E. WELLER, OF SOUTH BEND, INDIANA

SAWING APPARATUS

Application filed March 22, 1928. Serial No. 263,867.

This invention relates to sawing apparatus and more particularly to the production of a saw table capable of use in the production of universal cuts.

An important object of the invention is to provide a device of this character which may be readily and cheaply constructed, which may be readily shipped from place to place, thereby enabling its use in contracting work and which will be durable and efficient in service.

A further object of the invention is the production of a novel and improved means for mounting a reciprocating table for co-action with a stationary saw.

These and other objects I attain by the construction shown in the accompanying drawings, wherein for the purpose of illustration is shown a preferred embodiment of my invention and wherein:—

Figure 1 is a side elevation of a saw table constructed in accordance with my invention;

Figure 2 is a plan view thereof;

Figure 3 is a transverse section on the line 3—3 of Figure 1;

Figure 4 is a section on the line 4—4 of Figure 1;

Figure 5 is a section on the line 5—5 of Figure 4;

Figure 6 is a section on the line 6—6 of Figure 3;

Figure 7 is a detail of the bearing for the saw arbor;

Figure 8 is a sectional view on an enlarged scale taken on a plane extending vertically through the mandrel rotating and adjusting means, and Figure 9 is a perspective view of the support for the pivoted bearing of the mandrel.

Referring now more particularly to the drawings, the numeral 10 generally designates parallel tracks connected to one another by sills 11. Arising from each track at the center thereof is an A-shaped brace 12, which is stationary with relation to the track. Connecting the cross bars 13 of the A-shaped braces is a support 14 to which is connected the lower end of a standard 15, to the upper end of which a bearing support 17 is secured embodying spaced arms having bearings 18 in which are engaged pintles 19 of a split bearing block 20. This bearing block can swing in a vertical plane and provides a bearing for one end of a saw mandrel 21.

Secured to the standard 15, as at 15a, is an arcuate arm 22 which is slotted and has operable within the slot thereof a bearing member, affording a bearing 23 through which the mandrel shaft is directed. An arm 24 is formed integrally with and extends downwardly from the bearing member 23, and is provided at its lower end with bearing members 24a for a shaft 25. The shaft 25 has secured thereto a gear 26 meshing with rack teeth 26a formed on one wall of the slot of the arcuate arm 22. The outer ends of the mandrel 21 and shaft 25 are connected by universal joints 27 and 27a with one of spline-connected telescopic shaft sections 28. The other section of each of the spline shaft sections is connected through a universal joint 29 with a shaft section 30 mounted in a bearing 31 carried by one of the standards 12. The outer end of the shaft section 30 which is connected with the mandrel 21 has mounted thereon a pulley 32, which is belt-connected, as at 33, with a pulley 34 upon the armature shaft of a motor 35 secured to the sills 11. The outer end of the shaft section 30 connected with the shaft 25 is squared or otherwise adapted for engagement with a crank 36. It will be obvious that by rotating the crank 36, the position of the outer end of the mandrel 21 may be adjusted and accordingly the angle of this mandrel to the horizontal may be determined. The arcuate arm 22 is preferably graduated at 37 and the bearing 23 has secured thereto a pointer finger 38 coacting with these graduations. The bearing 23 may be locked in adjusted positions by means of a threaded clamp screw 39 extending through a slot 40 formed in the arcuate arm and having threaded engagement with the bearing 23.

The numeral 41 generally designates a carriage, the side members of which each comprise a pair of spaced V-shaped standards 42, adjacent arms of which are connected to one another by longitudinal beams 43 and the apices of which are provided with rollers R bearing upon the sills 11. Secured to the beams 43 of the side members is a circular T-beam structure T, the head forming flanges of which are horizontally directed and arranged downwardly. The flange 44 or inner flange provides a seat for the periphery of the disk 46 having a slot 47 in which the saw 48 may operate. Supported from the outer flange 45 and from the horizontal flange of an angle iron ring 49 secured to the upper ends of the free arms 50 of the A-shaped supports is a flat annulus 51, which is rotatable and has graduations 52 coacting with an index 53 upon the outer ring 49 showing the degree of displacement of the radius of the annulus from a given point. The annulus has an opening 54 formed therein, the edges of which are perpendicular to this radius and slidable within this opening upon tracks 54a is a board guide 55, the upper surface of which is flush with the face of the annulus. At one edge, this board guide has an upstanding flange 56 against which an edge of the board being guided may be disposed and from this flange, the board guide is graduated in inches, as generally indicated at 57. The under surfaces of the tracks are in the form of racks 58 and the board guide has depending therefrom brackets 59 in which is mounted a shaft 60 bearing pinions 61 engaging these racks. This shaft may be rotated by the crank 36 applied to the squared outer end 62 thereof.

In the use of the device, for cutting a simple angle, the annulus is rotated until the proper degree for the angle coincides with the index 53, at which time the annulus is locked against rotation by tightening a hand set-screw 63 extending through the outer ring. The board is placed upon the guide with one edge against the flange 56 and the table reciprocated by engagement of the hand of the operator with the handle 64 secured to the ring. For cutting a compound angle, the annulus is adjusted to one of these angles and the saw adjusted to the other angle and the actual cutting operation performed in the manner above described. To rip a board a given width, the annulus is set at zero and the board guide adjusted for the proper width of the cut. To assist in this adjustment, the annulus is provided with an index 65 cooperating with the index of the board guide.

From the foregoing, it will be obvious that I have provided a readily manipulatable saw carriage, permitting the use of the ordinary circular saw for universal cuts and have provided a construction which may be readily transported from place to place, as the various elements may be readily separated from one another for transportation.

It will also be obvious that certain changes are possible in the construction hereinbefore set forth without materially departing from the spirit of the invention and I accordingly do not limit myself to such specific structure except as hereinafter claimed.

I claim:—

1. In sawing apparatus, a saw arbor mounted to rotate and to swing in a vertical plane to adjust the angle of a saw carried thereby to the vertical, a reciprocable table embodying a horizontal disk having a diametrical slot for the passage of a saw carried by the arbor and a flat annulus rotatable about and surrounding the disk.

2. In sawing apparatus, a saw arbor mounted to rotate and to swing in a vertical plane to adjust the angle of a saw carried thereby to the vertical, a reciprocable table embodying a horizontal disk having a diametrical slot for the passage of a saw carried by the arbor, a flat annulus rotatable about and surrounding the disk and a board-supporting guide adjustable chordally of the annulus.

3. In sawing apparatus, a saw arbor mounted to rotate and to swing in a vertical plane to adjust the angle of a saw carried thereby to the vertical, a reciprocable table embodying a horizontal disk having a diametrical slot for the passage of a saw carried by the arbor, a flat annulus rotatable about and surrounding the disk, a board-supporting guide adjustable chordally of the annulus, said guide having along an end edge thereof an upstanding flange and means for indicating the angle of said flange to the saw slot of the disk.

4. In sawing apparatus, a saw arbor mounted to rotate and to swing in a vertical plane to adjust the angle of a saw carried thereby to the vertical, a reciprocable table embodying horizontal disk having a diametrical slot for the passage of a saw carried by the arbor, angle iron rings surrounding said disk, a flat annulus rotatably supported thereby, means extending through the outer ring for engagement with the annulus for securing the annulus in adjusted positions and a handle whereby the table may be shifted.

5. In sawing apparatus, a saw arbor mounted to rotate and to swing in a vertical plane to adjust the angle of a saw carried thereby to the vertical, a reciprocable table embodying a horizontal disk having a diametrical slot for the passage of a saw carried by the arbor, angle iron rings surrounding said disk, a flat annulus rotatably supported thereby, means extending through the outer ring for engagement with the annulus for securing the annulus in adjusted positions, a handle whereby the table may be shifted and a board-supporting guide adjustable chordally of the annulus.

In testimony whereof I hereunto affix my signature.

LYNN E. WELLER.